United States Patent [19]

Reinartz et al.

[11] Patent Number: 5,417,484
[45] Date of Patent: May 23, 1995

[54] HYDRAULIC CHANGE-OVER VALVE FOR A VEHICLE BRAKE SYSTEM

[75] Inventors: Hans-Dieter Reinartz, Frankfurt-am-Main; Erhard Beck, Weilburg; Stefan Risch, Wiesbaden, all of Germany

[73] Assignee: ITT Automotive Europe GmbH, Germany

[21] Appl. No.: 142,438

[22] PCT Filed: Jan. 9, 1993

[86] PCT No.: PCT/EP93/00033

§ 371 Date: Nov. 24, 1993

§ 102(e) Date: Nov. 24, 1993

[87] PCT Pub. No.: WO93/19960

PCT Pub. Date: Oct. 14, 1993

[30] Foreign Application Priority Data

Apr. 3, 1992 [DE] Germany .............. 42 11 097.1
Oct. 24, 1992 [DE] Germany .............. 42 36 045.5

[51] Int. Cl.6 .................................... B60T 13/138
[52] U.S. Cl. ........................... 303/116.1; 303/900
[58] Field of Search ............. 303/10, 11, 113.2, 116.1, 303/116.2, 900, 901

[56] References Cited

U.S. PATENT DOCUMENTS 4,919,495  4/1990  Kircher et al. .......... 303/901 X
5,007,687  4/1991  Kircher et al. .......... 303/901 X

FOREIGN PATENT DOCUMENTS 563965  10/1993  European Pat. Off. ........ 303/901
2250074  4/1973  Germany .................. 303/901
3530210A1  3/1986  Germany .
3638980A1  5/1988  Germany .
3831426A1  4/1989  Germany .
4016756  11/1991  Germany .................. 303/900
2128952  5/1990  Japan .................... 303/901

*Primary Examiner*—Robert J. Oberleitner
*Assistant Examiner*—Alfred Muratori
*Attorney, Agent, or Firm*—Dykema Gossett

[57] ABSTRACT

A hydraulic change-over valve is adapted for a vehicle brake system with anti-lock control and traction slip control which operates according to the return delivery principle during an anti-lock control operation and the self-priming pump of which takes in pressure fluid through the master brake cylinder during a traction slip control operation. The change-over valve is arranged in the suction line between a pump and a master brake cylinder and shuts off the connection during each pedal-operated braking operation and opens it during each traction slip control operation. To avoid negative effects on the brake pedal feeling, restrictors are provided which prolong the closing time of the switch-over valve so that the fluid volume for switching is received gradually and continuously. The switching position is determined by a diaphragm, whose effective surface depends on its flexure to afford a non-stick-slip operation.

5 Claims, 3 Drawing Sheets

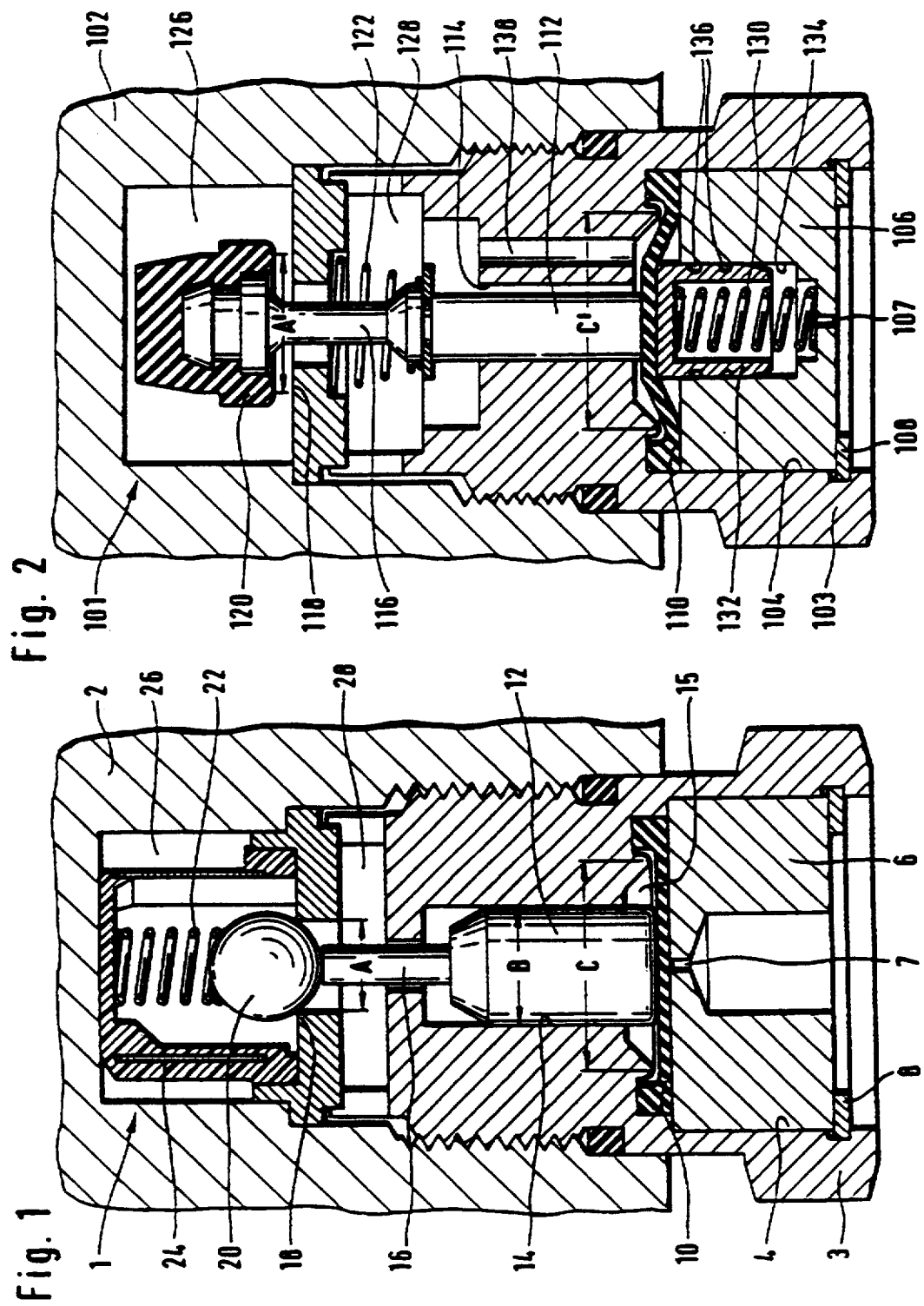

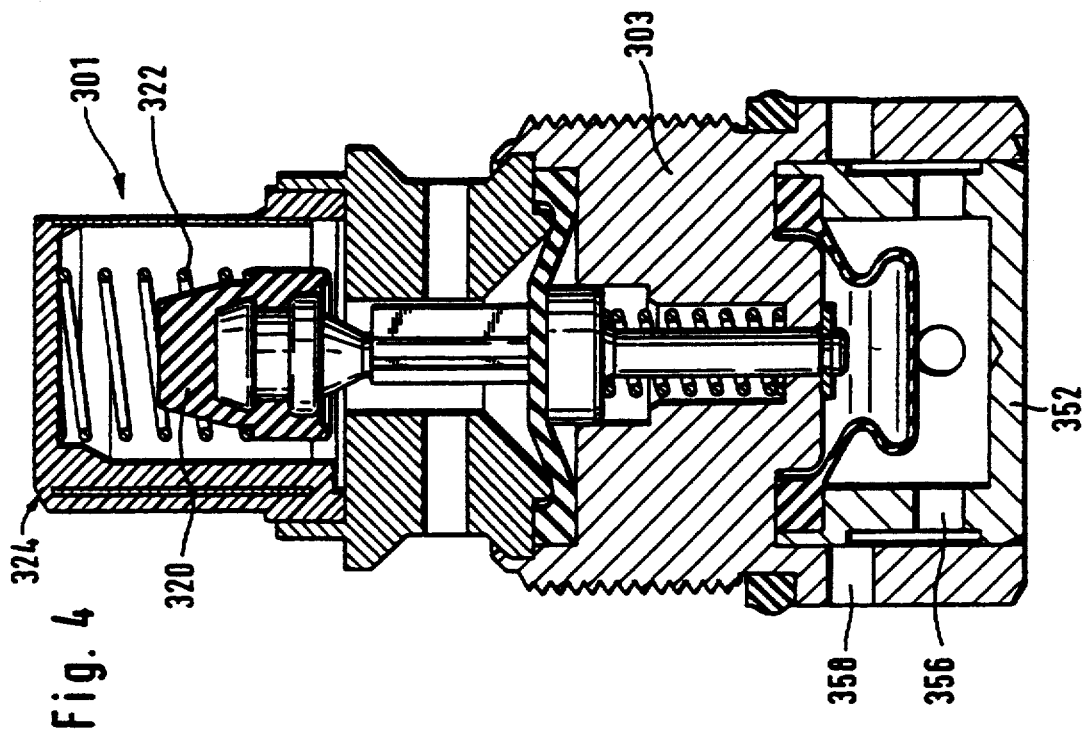
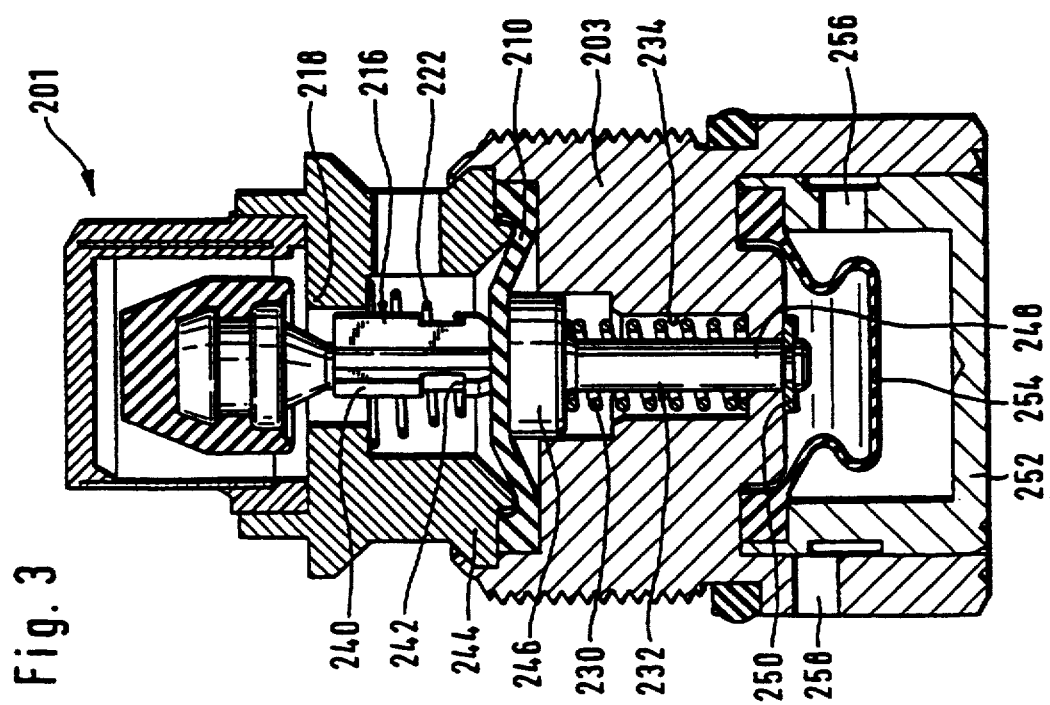

HYDRAULIC CHANGE-OVER VALVE FOR A VEHICLE BRAKE SYSTEM

FIELD OF THE INVENTION

The present invention relates to a hydraulic change-over valve having a prolonged closing time.

BACKGROUND OF THE INVENTION

In a brake system disclosed by German patent DE-38 31 426 A1, a brake line leads to a wheel brake of a driven wheel from a master brake cylinder through a hydraulically controlled three-way/two-position valve, which simultaneously serves as a change-over valve and as a cut-off valve, and through an electromagnetic inlet valve, open in its de-energized state. When an anti-lock control operation is performed, pressure fluid is discharged into a low-pressure accumulator through an electromagnetic outlet valve closed in its de-energized state. A return pump supplies the fluid out of this accumulator into the brake line between the hydraulic three-way/two-position directional control valve and the inlet valve again. For a traction slip control operation, the suction side of the pump is connected to the master cylinder through the third port of the three-way/two-position directional control valve so that it can take in fluid out of the pressure fluid reservoir via the master cylinder. When the brake is not applied, the connection is established from the master brake cylinder to the suction side of the pump, while the brake line is closed. As soon as pressure is built up by the master brake cylinder, the three-way/two-position directional control valve will assume its second switch position in which the connection is established from the master brake cylinder to the wheel brake.

Hydraulic change-over valves are advantageous in economizing electric lines. It is a disadvantage, however, that a certain fluid volume for switching is required on each brake application to change the valve over, which impairs the pedal feeling at the brake pedal, since the fluid volume intake takes place abruptly when the valve closes.

OBJECTS OF THE INVENTION

Therefore, it is an object of the present invention to provide a hydraulic change-over valve which avoids impairments during the pedal application.

It is another object of the present invention to provide for continuous intake of the fluid volume for switching by slowing the switching time so that the driver does not feel any effects on the brake pedal.

It is yet another object of the present invention to employ a diaphragm as an operating device that avoids "stick-slip effect" and that avoids abrupt start-up as is the case with a piston having a rubber seal and that permits variation of its effective surface, depending on the switching stroke.

BRIEF DESCRIPTION OF THE DRAWINGS

These and other objects of the present invention will be explained in more detail by way of the specification with reference to the accompanying drawings, in which:

FIG. 1 is a representative cross-sectional view of a first embodiment of a change-over valve in accordance with the present invention;

FIG. 2 is a representative cross-sectional view of a second embodiment of a change-over valve in accordance with the present invention;

FIG. 3 is a representative cross-sectional view of a third embodiment of a change-over valve; and FIG. 4 is a representative cross-sectional view of a fourth embodiment of a change-over valve in accordance with the present invention.

DETAILED DESCRIPTIONS OF THE PREFERRED EMBODIMENTS

Figure 5:
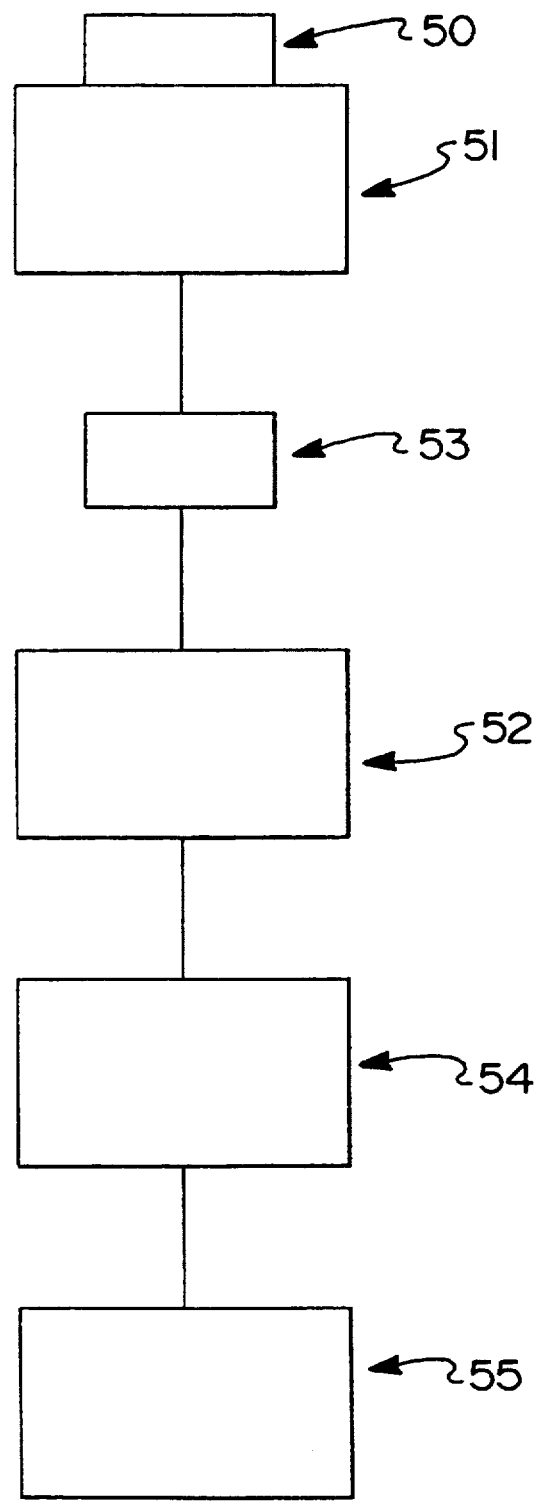
FIG. 5 is a block diagram of the brake system having the change-over valve of the present invention.

The change-over valve 1 illustrated in FIG. 1 is arranged in the housing 2 and is fixed by the screw member 3 which is screwed into the housing 2 in sealed relationship thereto. Instead of a screw coupling, a closure member can also be caulked or coupled by plug-in engagement. Further possibilities of fixation consist of attaching a circular clip, such as a lock ring, which will be referred to herein as a "circlip," to the housing. As a still further possibility, a self-clinching device may be used. In the latter possibility, a closure member would be chosen which is more rigid than the housing receiving it. When the closure member, screw 3, is inserted under the effect of force, the housing 2 deforms such as to provide a form-locking engagement.

The screw member 3 has on its outside a cylindrical recess 4 in which an insert 6 is attached with the circlip 8. Disposed on the center line of the insert 6 is an atmospheric port 7 which connects a diaphragm 10 to the atmosphere. The diaphragm 10 is pressed against the screw member 3 by the insert 6. A piston 12 abuts the diaphragm 10 on the side of diaphragm 10 facing the housing interior. The piston 12 is guided in a close fit in a bore 14, which expands adjacent the diaphragm 10 to form a pressure chamber 15. On its end surface remote from the diaphragm 10, the piston 12 comprises an axial tappet 16 which projects into the opening of the valve seat 18 and which abuts a valve closure member 20. The valve closure member 20 is acted upon by a valve spring 22, which forces the valve closure member 20 towards a valve seat 18. A filter 24 pressed into the valve seat 18 prior to the assembly of the valve closure member 20, the valve spring 22 and the valve seat 18 simultaneously serves as a spring retainer for the valve spring 22. Thus, the change-over valve 1 incorporates three chambers 26, 28 and 15 which can be exposed to different pressures at least temporarily. The chamber 26 upstream of the valve seat 18 is subjected to the pressure of the master brake cylinder. In the chamber 28 downstream of the valve seat 18 and upstream of the piston 12, the pressure on the suction side of the pump prevails. The pressure in the pressure chamber 15 between the piston 12 and the diaphragm 10 temporarily can differ from that in the chamber 28, since the only pressure-fluid connection towards the chamber 28 extends along the circumference of the piston 12 so that only a throttled pressure fluid flow propagates into the pressure chamber 15. Three cross-sectional surfaces are of significance for the function of the valve, namely the opening cross-section A of the valve seat 18, the cross-section B of the piston 12 as well as the effective cross-section C of the diaphragm 10. A is chosen to be less than B, and C is greater than B. The following function results therefrom:

The change-over valve 1 is closed in the inactive position. During pedal-operated braking, the pressure rises in chamber 26, while atmospheric pressure prevails in chamber 28 and in the pressure chamber 15. Consequently, the valve remains closed. Admittedly, the pressure in chamber 28 drops below atmospheric pressure during an anti-lock control operation. However, since the master cylinder causes braking pressure to prevail at the same time, the closing force applied to the valve closure member 20 is in excess of the suction force of the pump in chamber 28. Also in this event the valve 1 does not open. Only in the event of a traction slip control operation, when the pressure in chamber 28 is below the atmospheric pressure yet, atmospheric pressure prevails in chamber 26, are the opening forces greater than the closing forces. This results from the cross-section B which is larger than cross-section A. The valve opens at once, since the increase in volume brought about in the pressure chamber 15 by the stroke of the piston 12 is compensated for by the flexible diaphragm 10. Due to the pressure decreased in the chamber 28 compared to the pressure chamber 15, the pressure fluid gradually propagates out of the pressure chamber 15 along the piston's circumference into the chamber 28. Upon termination of the traction slip control operation, atmospheric pressure prevails in chamber 28 again, while the pressure in the pressure chamber 15 is still below atmospheric pressure and the fluid volume is close to zero because the diaphragm 10 abuts generally in a plane on the screw member 3. In addition, atmospheric pressure acts on the diaphragm 10 from below through the atmospheric port 7. Therefore, the valve is allowed to close but slowly, since the pressure compensation in the pressure chamber 15 can take place in a throttled fashion only. Therefore, pressure fluid is taken in continuously for closing the change-over valve 1. This slow closing is effected irrespective of whether a pedal-operating braking operation follows directly the traction slip control operation or not. Even if a pedal-operated braking operation takes place, no negative effect on the brake pedal can be felt, since the fluid volume intake for switching of the change-over valve 1 is adapted to the fluid volume intake of the brake system during a braking operation.

FIG. 2 displays a second embodiment of an inventive change-over valve. The reference numerals of parts which perform the same function as in FIG. 1 are augmented by 100 with respect to the reference numerals in FIG. 1. This second change-over valve 101 is open in its inactive position. In addition to the atmospheric pressure, the force of an auxiliary spring 130 acts from below on the diaphragm 110 in the opening direction. The spring 130 is disposed with the bowl of a bowl shaped auxiliary piston 132 and presses upwardly against the piston 132, which is guided in the bore 134 in a close fit, towards the diaphragm 110. At its periphery, the auxiliary piston 132 comprises circumferential annular gaps 136 so that the auxiliary piston 132, with its periphery in conjunction with the bore 134, forms a restrictor.

The diaphragm can be furnished with air from below only along the periphery of the auxiliary piston. Throttling does not take place upstream of the diaphragm 110 in the pressure-fluid-filled area of the change-over valve 101. The piston 112 extends, with play, through the bore 114. In addition, a bypass connection 138 communicates between the chamber 128, which is connected to the suction side of the pump, and the upper side of the diaphragm 110. This bypass 138 can be omitted when the cross-section of the bore 114 is rated to be correspondingly large.

A valve spring 122, which is of weak design in comparison to the auxiliary spring 130 in this arrangement, takes support on the bottom side of the valve seat 118, on the one hand, and on an annular disc positively connected with the piston 112, on the other hand, and acts upon the piston 112 in the closing direction of the change-over valve 101. A valve closure member 120 is not coupled with a tappet 116 in a spherical joint but in form-locking manner. The effective surface A' between the valve closure member 120 and the valve seat 118 is dictated by the closing surface covered by the valve closure member 120 at the valve seat 118. While the cross-section of the piston 112 does not have any influence on the valve's behavior, the cross-section of the auxiliary piston 132 has an effect due to throttling at its periphery. In this change-over valve 101, the master cylinder pressure acts at once on the entire effective cross-section C' of the diaphragm 110 during pedal-operated braking. It operates in opposition to the force of the auxiliary spring 130 and the volume of air trapped downstream of the diaphragm 110, which can be discharged to the atmosphere only in a restricted fashion so that the closing time of this change-over valve is longer. In contrast to the embodiment of FIG. 1, opening of the valve in FIG. 2 takes place in a decelerated manner also, since air can flow only gradually to the bottom side of the diaphragm. Since this valve is open in its unpressurized state, quick switching is not required upon the commencement of a traction slip control operation, because the change-over valve 110 is already in the required position. That means a safe function and an undisturbed pedal feeling is safeguarded in both embodiments.

FIG. 3 and FIG. 4 present further variants of a design of the change-over valve, open when unpressurized. The reference numerals of parts which correspond to those in the previous Figures are augmented by another 100 and 200, respectively.

The overall length is considerably shorter in the embodiment of FIG. 3 compared to FIG. 2 because the need for piston 112 in the change-over valve 201 is obviated and the diaphragm 210 is in direct contact with the tappet 216. The tappet 216 has a star-like cross-section augmented by longitudinal ribs 240. Because of the shape of tappet 216, a larger valve opening cross-section is accomplished. A truncated-cone-shaped valve spring 222 acts directly on notches 242 in the longitudinal ribs 240, to obviate an annular disc.

Owing to the omission of another piston, the diaphragm 210 bears more closely against the valve seat 218, between the screw member 203 and the insert 244 sheared thereon which, at the same time, forms the valve seat 218. For reasons of manufacture, however, the valve seat can also be provided on a separate element like in FIG. 2. The auxiliary piston 232 abutting the diaphragm 210 from the other side is of stamp-like configuration, the stamp foot 246 being disposed at the diaphragm 210. The auxiliary piston 232 is guided in the screw member 203 in an axial bore 234 stepped twice to have its largest diameter conformed to the stamp foot 246 and its smallest diameter conformed to the stamp shaft 248 penetrating screw member 203. Arranged in the area of an interposed medium diameter of the bore 234 is the auxiliary spring 230 which takes support on the step to the smallest diameter and applies a force on the stamp foot 246 towards the diaphragm 210. This force is superior to the opposed force of the valve spring 222. The stroke of the auxiliary piston 232 towards the diaphragm 210 is confined by an annular disc 250 which locks into the stamp shaft 248 outside of the screw member 203. To achieve cost reduction, the bottom end of the stamp shaft 248 also can be simply enlarged by a riveting action.

As a protection against contamination and corrosion, an elastic protective cap 254 is mounted around the stamp shaft 242 where the stamp shaft 248 exits from the screw member 203. The cap is attached to the screw member 203 by a bowl-type cover 252 caulked with the screw member 203. With full pressure compensation, the protective cap 254 offers absolute seal-tightness relative to dirt and liquids, while the cover protects against mechanic damage. To this end, it is provided with a radial opening 256 which is arranged at the periphery offset in relation to the radial opening 258 in the screw member 203 so that pressure compensation is possible, yet damage to the protective cap 254, for example, from a sharp object, is avoided. The protective cap 254 and/or the cover 252 are not required when there is no risk of contamination or damage. For instance, the protective cap 254 can extend into a radial annular groove in the screw member 203. The overall length is further shortened when both protective elements are omitted.

The type of construction illustrated in FIG. 4 is very similar to that of FIG. 3. The most striking difference resides in the arrangement of the valve spring 322 which is designed as a cylindrical helical spring in the change-over valve 301. Like in FIG. 1, it acts upon the closure member 320 while bearing against the filter 324.

An additional difference is that each radial channel lies opposite another. To avoid overlapping of the radial opening 356 and 358 in the cover 352 and in the screw member 303, the openings 356 have been provided in an axially offset manner.

Of course, the features of all of the foregoing designs of FIGS. 2, 3 and 4 can be combined as desired.

In FIG. 5, the brake system having the change-over valve (53) of the present invention is described. In this figure, (50) is the reservoir, (51) is the master cylinder, (52) is the hydraulic pump, (54) is the anti-lock device, and (55) is the wheel brake of a driven wheel.

We claim:

1. A hydraulic vehicle brake system that includes a master brake cylinder connected to a pressure fluid reservoir and communicating via a brake line at least with a wheel brake of a driven wheel, an anti-lock control device operating according to a return delivery principle, and a self-priming return pump which supplies fluid into a brake line and which has a suction side connectible in a connection through a suction line and through the master brake cylinder to a pressure fluid reservoir for the purpose of a traction slip control operation, a change-over valve disposed in the suction line for shutting off said connection at least always when the brake system is operated by a master brake cylinder and for opening the connection at least always when the pump sucks in fluid without simultaneous brake operation by the master brake cylinder, the change-over valve comprising:

at least one throttling means for inhibiting the passage of a fluid, whereby closing time of the change-over valve is prolonged; and a diaphragm having two sides, said change-over valve being adapted to supply and remove said fluid from and to said diaphragm, through said throttling means.

2. A hydraulic brake system as claimed in claim 1, whereby the at least one throttling means includes a piston and a bore, the piston guided in a close fit in the bore, the throttling taking place along the piston's periphery in the presence of axial fluid flow.

3. A hydraulic brake system as claimed in claim 2, wherein the change-over valve has a flexure which determines a switch position of the change-over valve said change-over valve being adapted for said fluid supplied and removed from only one side of said diaphragm through said throttling means.

4. A hydraulic brake system as claimed in claim 3, further comprising a first chamber for communication with said suction side of the pump, a second chamber for being placed under pressure by said master cylinder, a connection between said first chamber and said second chamber, a valve seat in said second chamber, an atmospheric port communicating with said first chamber, and a closure member, the diaphragm isolating said atmospheric port from said first chamber, said connection between said first and second chambers being closable by said closure member which is movable to abut said valve seat and which is movable by the diaphragm.

5. A hydraulic brake system as claimed in claim 4, further comprising an auxiliary spring, the force of said auxiliary spring being applied to the side of said diaphragm at which the atmospheric port is disposed, and wherein the change-over valve is open in a de-energized state.

* * * * *